(No Model.)

P. T. GRIFFITH.
HYDRAULIC MOTOR.

No. 290,039. Patented Dec. 11, 1883.

Attest:
Walter D. Maloson
F. L. Middleton

Inventor
Riley T. Griffith
by Joyce & Spear (No Model.) 2 Sheets—Sheet 2.
P. T. GRIFFITH.
HYDRAULIC MOTOR.
No. 290,039. Patented Dec. 11, 1883.
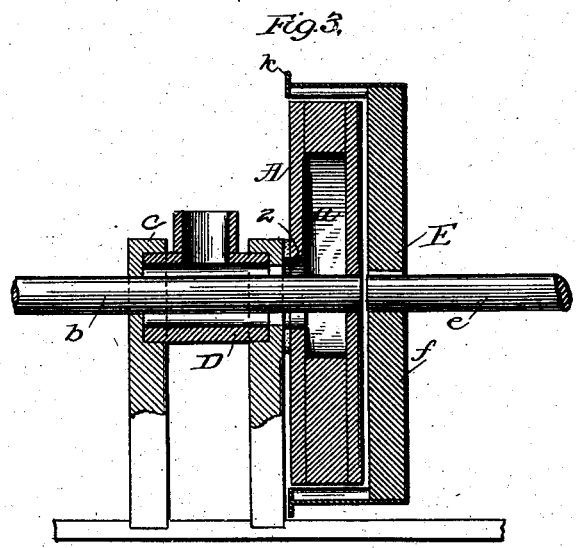
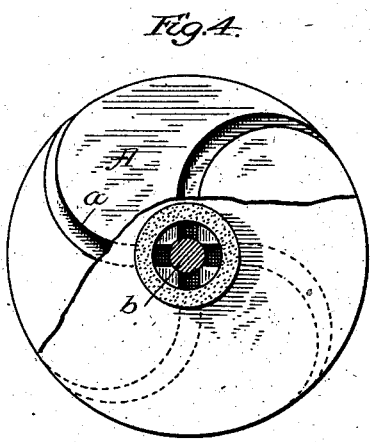
Attest:
Walter Donaldson
F. L. Middleton
Inventor:
Peleg T. Griffith
by Joyce & Spear
Attys.

UNITED STATES PATENT OFFICE.

PELEG T. GRIFFITH, OF DANBY, VERMONT.

HYDRAULIC MOTOR.

SPECIFICATION forming part of Letters Patent No. 290,039, dated December 11, 1883.

Application filed May 24, 1883. (No model.)

*To all whom it may concern:*

Be it known that I, PELEG T. GRIFFITH, of Danby, in the county of Rutland and State of Vermont, have invented a new and useful Improvement in Hydraulic Motors; and I do hereby declare that the following is a full, clear, and exact description of the same.

My invention relates to hydraulic motors. The object is to obtain all the power which can be obtained from the falling column of water by simpler mechanisms than those ordinarily in use or heretofore known.

In the accompanying drawings I have shown my invention, hereinafter described, and particularly specified the parts in combination which I claim as my invention. In these drawings—

Figure 1:
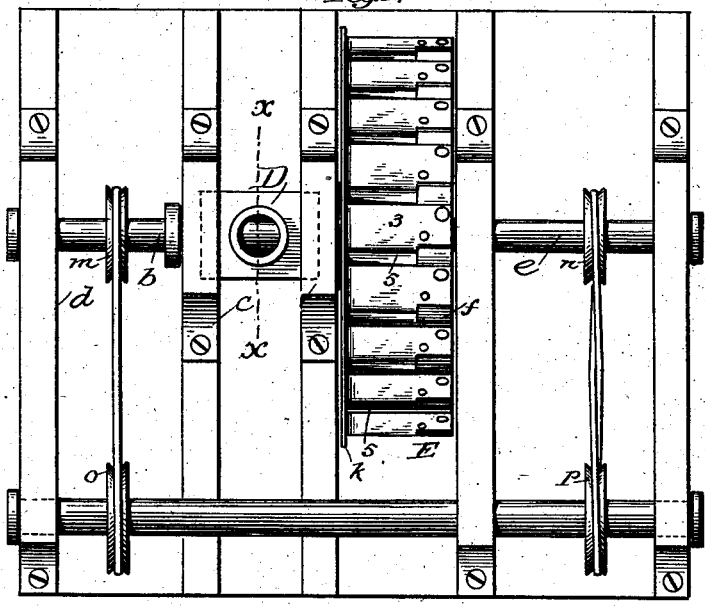
Figure 2:
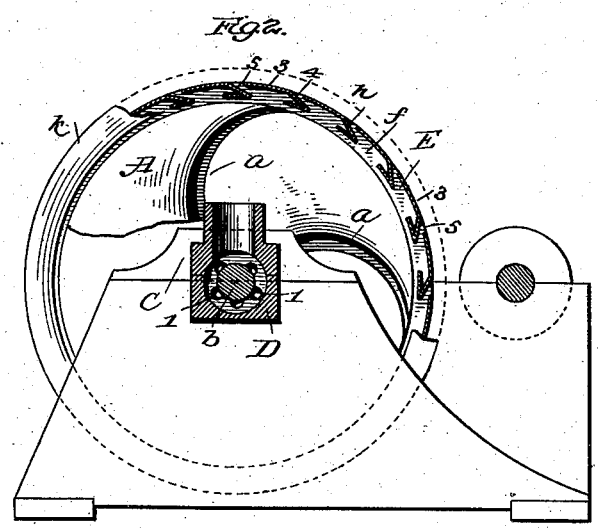

Figure 1 represents a plan view of the outer wheel and the frame supporting the whole structure. Fig. 2 is a section on line $xx$ of Fig. 1, the shell of the outer wheel being partly broken away. Fig. 3 is a vertical longitudinal section of Fig. 1 through the two wheels and the supply-pipe. Fig. 4 is a separate view of the inner wheel.

The general principle of my invention includes a hollow wheel in communication with the head of water, and provided with openings for the tangential discharge of the water from the periphery of said wheel, whereby motion is imparted thereto, and a second wheel adapted to receive the water from the first, and provided with buckets fitted to receive the impact of the tangentially-discharged water, the wheels being mounted on independent shafts and rotating in opposite direction.

In the drawings, A represents the hollow wheel, or wheel provided with suitable water-passages. These passages are shown at $a\ a$, Fig. 2. They are formed on a curve, as shown, from the hollow center about the shaft to the periphery. The shaft $b$ is solid and is journaled in suitable bearings, $c\ d$. Within the bearing $c$ is a box, D, forming an enlarged bearing or annular cavity about the shaft. The end of the box next to the wheel is provided with openings 1; but the bearing $c$ is closely fitted to the shaft, to prevent the escape of water in that direction. There is an annular opening at 2 in the wheel A on the side next to the bearings, for the admission of the water. It is provided with suitable packings, and fits snugly on the outer face next to the box, so that the perforations at the end register with the annular opening in the wheel. By this construction, water from the pipe, brought from any suitable head, is discharged into the wheel A, and forced out the curved passage, and is discharged tangentially, thus driving the wheel in its escape.

The wheel E is mounted upon a separate axle, $e$, journaled in suitable bearings. This wheel consists of a solid disk or head, $f$, to which the shaft is fixed. The buckets $h$ are set in series about the periphery of this disk, forming an annular flange to said disk. They are made of metal plate, and have a back, 3, and pocket 4, and are so constructed and arranged as to leave an opening, 5, between the rear of the pocket and the edge of the back. This opening is for the escape of the water. A circular rim, $k$, covers the ends of the pockets and gives them support. The two shafts are provided with pulleys $m\ n$, which are connected to belt $o\ p$ on the shaft F. One belt being crossed, both wheel-shafts are made to exert their power upon the shaft F. It will be apparent that the original impulse is given to the wheel A, which receives the first force of the water; but the stream escaping from the wheel A strikes in the buckets of the wheel E, imparts to it its force, causing the wheel E to flow and join the wheel A in its action upon the shaft F.

The bearings may be changed in their construction, but not to omit the hollow box about the journal of the wheel A and its communication with the said wheel.

Having thus described my invention, I claim—

1. The wheel A, having interior hollow spaces or passages for the tangential discharge of the water, and openings about its shaft communicating with a hollow box, in combination with an inclosing-wheel mounted upon separate shaft, and provided with buckets adapted to receive the tangential streams of water, all substantially as described.

2. The wheel E, having a solid head or disk, and having a flange composed of the pockets, constructed as described, provided with openings between the pockets and the backs, and a flange, $k$, in combination with interior wheel having side passages and shaft, substantially as described.

3. The combination of the wheel A, having hollow spaces or water-passages and openings about the shaft, and a bearing, c, with a stationary box about the journal, provided with openings registering with the opening at the shaft, and having also pipe-connection, all substantially as described.

4. In a water-motor of the class described, the combination, with the wheels A E and their respective shafts, adapted to move in opposite directions, of the shaft F, running parallel with the shafts of the said wheels A E, and connected thereto by suitable belts, whereby continuous motion in one direction is imparted to the said shaft F, substantially as described.

In testimony whereof I have signed my name to this specification in the presence of two subscribing witnesses.

PELEG T. GRIFFITH.

Witnesses:
GEORGE MINETT,
EDWARD J. READ.